United States Patent [19]

Braun et al.

[11] 4,211,681
[45] Jul. 8, 1980

[54] POLY(ETHYLENE OXIDE) COMPOSITIONS

[75] Inventors: David B. Braun, Ridgefield, Conn.; Stephen Drap, Pawling, N.Y.

[73] Assignee: Union Carbide Corporation, New York, N.Y.

[21] Appl. No.: 934,265

[22] Filed: Aug. 16, 1978

[51] Int. Cl.² .............................................. C08L 71/02
[52] U.S. Cl. ........................... 260/29.2 R; 260/33.4 R
[58] Field of Search ...................... 260/29.2 R, 33.4 R, 260/45.8 A, 45.95 E, 45.95 G

[56] References Cited

U.S. PATENT DOCUMENTS

| | | | |
|---|---|---|---|
| 3,278,473 | 10/1966 | Judd | 260/29.2 |
| 3,450,658 | 6/1969 | Morison | 260/29.2 R |
| 3,645,950 | 2/1972 | Stratta | 260/29.2 |
| 3,729,441 | 4/1973 | Tomomatsu | 260/45.95 G |
| 3,843,589 | 10/1974 | Wartman | 260/33.4 R |

FOREIGN PATENT DOCUMENTS 43-08621  4/1968  Japan .

*Primary Examiner*—Paul R. Michl
*Attorney, Agent, or Firm*—Gary L. Wamer

[57] ABSTRACT

Non-toxic, water soluble compositions of high molecular weight poly(ethylene oxide), propylene glycol, water, and stabilizer allow the thermoplastic processing of high molecular weight poly(ethylene oxide) to proceed more facilely without extensive polymer decomposition. The compositions can be used to produce shaped articles such as films or tubes; they can also be used as a denture adhesive.

8 Claims, No Drawings

POLY(ETHYLENE OXIDE) COMPOSITIONS

BACKGROUND OF THE INVENTION

Poly(ethylene oxide) of molecular weight from about 600,000 undergoes degradation during thermoplastic processing when exposed to heat and shearing forces resulting in chain scission and consequently a loss of physical properties. Substantial reductions in molecular weight are observed during such processing operations. The chain scission occurs rapidly causing poly(ethylene oxide) compounds to lose their strength and in many instances become extremely tacky. Experience has shown that conventional thermoplastic processing of poly(ethylene oxide) compositions with a molecular weight above about 600,000 can result in polymer degradation before the processing is complete.

To remedy this situation, poly(ethylene oxide) formulations have been stabilized with phenothiazine and plasticized with the ethylene oxide adduct of nonylphenol. However, for poly(ethylene oxide) whose molecular weight exceeds 600,000, the addition of a mixture of phenothiazine and the ethylene oxide adduct of nonylphenol does not provide the desired stability when the poly(ethylene oxide) compositions are calendered into films. Another problem encountered is the fact that poly(ethylene oxide) compositions containing a mixture of phenothiazine and the ethylene oxide adduct of nonylphenol are not recognized for applications where the composition may be ingested by humans. Also, films which contain phenothiazine may undergo substantial discoloration during storage.

Compositions of poly(ethylene oxides) having molecular weights greater than 600,000 which can be formed into shaped articles are becoming commercially important.

SUMMARY OF THE INVENTION

It has now been found that compositions containing poly(ethylene oxide), water, propylene glycol and certain hereinafter defined stabilizing additives can be produced that can be formed into shaped articles without excessive polymer degradation even when the polymer molecular weight exceeds 600,000. It was found that the compositions of this invention can be used to produce thin films and denture adhesives.

DESCRIPTION OF THE INVENTION

This invention is a composition of poly(ethylene oxide), water, propylene glycol, and certain non-toxic stabilizers. This composition can be more readily processed even when the poly(ethylene oxide) employed is of high molecular weight.

The poly(ethylene oxide) suitable for use in the compositions of this invention has a molecular weight of from about 100,000 to about 10,000,000 preferably from about 600,000 to about 5,000,000. Poly(ethylene oxide) resins having molecular weights higher than 5,000,000 appear to undergo a greater degree of decomposition during thermoplastic processing. Polymers having molecular weights substantially below 600,000 show little improvement during the processing of the compositions containing the poly(ethylene oxide). The most preferred molecular weight of the poly(ethylene oxide) is from about 1,000,000 to about 4,000,000 for use in denture adhesives.

The concentration of the poly(ethylene oxide) in the compositions of this invention is from about 25 weight percent to about 98 weight percent, preferably from about 35 weight percent to about 90 weight percent, based on the total weight of the composition.

The concentration of water present in the compositions of this invention is from about 1 weight percent to about 50 weight percent, preferably from about 5 weight percent to about 20 weight percent, based on the total weight of the composition. The water serves to reduce the melt viscosity of the composition resulting in a reduction of the shearing forces during thermoplastic processing and allowing the use of lower processing temperatures.

The propylene glycol used in the compositions of this invention is present at a concentration of from about 1 weight percent to about 50 weight percent, preferably from about 5 weight percent to about 20 weight percent, based on the total weight of the composition. The combination of propylene glycol in conjunction with water extends the thermoplastic processing time of the high molecular weight poly(ethylene oxide) compounds present in the formulations.

The stabilizers are present in the compositions of this invention at a concentration of from about 0.01 weight percent to about 1 weight percent preferably from 0.1 weight percent to about 0.5 weight percent, based on the total weight of the composition. The stabilizers are ascorbic acid, 2-,3-butyl hydroxyanisoles and monotertiary butyl hydroquinone. The stabilizers can be used individually or in combination with the sum of their weights falling within the enumerated concentration range.

The compositions of this invention can have present an inert filler if desired. Any of the known fillers can be used in quantities of up to about 80 percent by weight based on the total weight of the composition. Compositions containing higher concentrations of filler tend to have lower tensile strength. Illustrative of suitable fillers one can mention hydroxyethyl cellulose, hydroxyethyl methyl cellulose, hydroxypropyl cellulose, methyl cellulose and sodium carboxymethyl cellulose.

In a typical embodiment, poly(ethylene oxide) of an average molecular weight of about 4,000,000 was combined with 10 percent water, 10 percent propylene glycol and 0.2 percent butylated hydroxyanisole. The percentages of the three additives to the poly(ethylene oxide) are weight percents based on the total weight of the composition. The mixing was carried out at room temperature. First the poly(ethylene oxide) and the butylated hydroxyanisole was combined in a mixer and blended for five minutes. The propylene glycol was then added in three equal parts with the composition being mixed for two minutes after each of the first two additions of propylene glycol and for five minutes after the third addition. The water was added as a fine mist until the surface of the blend was covered and the blend was mixed for two minutes. The procedure was repeated until all the water had been added. This procedure is used to minimize agglomeration which normally occurs when water is added in large quantities to poly(ethylene oxide).

This invention has many advantages over other stabilized poly(ethylene oxide) compositions heretofore available. The compositions of this invention can be formed into shaped articles, for example thin films using conventional procedures and equipment. A desirable feature of this invention is that it makes possible the processing of the compositions containing the higher molecular weight poly(ethylene oxides) at temperatures below 85° C.

The films which can be manufactured using the compositions of this invention have a comparable stress endurance to films manufactured using non-recognized additives. In U.S. Pat. No. 3,154,514, poly(ethylene oxide) films were stretched and clamped in the elongated state until breakage occurred. A film containing 30 pph of nonylphenyl polyglycol ether lasted over 500 hours without breaking. In a test similar to the one used in U.S. Pat. No. 3,154,514, films calendered using the compositions of this invention also endured over 500 hours without breaking. The use of a recognized stabilizer makes these films produced with the compositions of this invention suitable for use in applications such as use as a denture adhesive.

It was completely unexpected and unobvious to find that the combination of water and propylene glycol together with certain heretofore defined stabilizers in combination with high molecular weight poly(ethylene oxides) would produce an essentially non-toxic, water soluble composition, which could be readily formed into shaped articles, for example, calendered into thin films.

For comparison purposes, Experiments A to C were carried out. In these Experiments compositions of poly(ethylene oxide) were prepared without the stabilizer.

EXPERIMENT A

There was charged to a torque rheometer mixer, which is used to blend high viscosity materials while at the same time measuring the torque required for the mixing, 50 grams of poly(ethylene oxide) of an average molecular weight of about 4,000,000. The speed of the mixing blades was set at 50 rpm. The temperature of the mixing chamber was raised to 98° C. to 102° C. and kept there throughout the test. The torque in meter-grams required to mix the composition was automatically recorded throughout the test and plotted versus time on a graph. This plot served as a measure of composition stability. Generally after the composition fluxed and reached a relatively uniform torque of from about 3100 to about 2100 meter-grams, it remained at that level until degradation, evidenced by a sharp torque drop, occurred. However, in this Experiment A a level plateau was not achieved.

Mixing was continued for 120 minutes or until the torque required to mix the composition decreased to 1000 meter-grams, whichever occurred first. The area under the curve of the plot of torque versus time was measured during the time span from 10 minutes to 110 minutes or to the time when the torque decreased to 2000 meter-grams. The area under the curve for the plot of torque versus time of the 50 gram sample of poly(ethylene oxide) measured 19,000 meter-gram minutes.

EXPERIMENT B

A composition was prepared by mixing 90 grams of poly(ethylene oxide) of an average molecular weight of about 4,000,000 and 10 grams of distilled water in a mixer. A portion of water was added in a fine mist by means of an atomizer until the surface of the resin was covered and the blend was mixed for two minutes. This procedure was repeated until all the water had been added. This procedure was used to prevent the agglomeration which normally occurs when water is added to poly(ethylene oxide) hindering the creation of a homogeneous blend. A 50 gram sample of this composition was charged to the apparatus described in Experiment A. The experiment and analysis for stability were conducted using procedures and conditions similar to those used in Experiment A. The area under the curve measured 59,000 meter-gram minutes. This experiment demonstrates that the addition of about 10 percent by weight of water to high molecular weight poly(ethylene oxide) increases the stability of the polymer by a factor of about 3.1 compared to that of Experiment A.

EXPERIMENT C

A composition was prepared by mixing 80 grams of poly(ethylene oxide) of an average molecular weight of about 4,000,000, 10 grams of propylene glycol and 10 grams of distilled water in a high speed mixer.

The 10 grams of propylene glycol was added in three equal parts with the composition being mixed for two minutes after each of the first two additions of propylene glycol and for five minutes after the third addition. The water was then added using procedures similar to those described in Experiment B. A 50 gram sample of the composition was charged to the apparatus described in Experiment A. The experiment and analysis were conducted using procedures and conditions similar to those used in Experiment A. The area under the curve measured 47,000 meter-gram minutes. This experiment demonstrates that the addition of 10 percent by weight of water and 10 percent by weight of propylene glycol to high molecular weight poly(ethylene oxide) increases the stability of the polymer by a factor of about 2.5 compared to that of Experiment A.

The following examples serve to further illustrate the invention.

EXAMPLE 1

A composition was prepared by mixing 80 grams of poly(ethylene oxide) of an average molecular weight of about 4,000,000 with 0.2 gram of ascorbic acid, 10 grams of propylene glycol and 10 grams of distilled water in a mixer. The ascorbic acid was added to the poly(ethylene oxide) first followed by blending for five minutes. The propylene glycol was then added in three equal parts with the composition being mixed for two minutes after each of the first two additions of propylene glycol and for five minutes after the third addition. The water was added in a fine mist by means of an atomizer. The surface of the blend was sprayed until it was covered and the blend was mixed for two minutes. This procedure was repeated until all the water had been added. A 50 gram sample of this composition was charged to a torque rheometer mixer. The speed of the mixing blades was set at 50 rpm. The temperature of the mixing chamber was raised to 98° C. to 102° C. and kept there throughout the test. The torque, in meter-grams, required to mix the composition was automatically recorded through the test and plotted versus time on a graph. This plot served as a measure of composition stability. Generally after the composition fluxed and reached a relatively uniform torque of from about 3100 to about 2100 meter-grams, it remained at that level until degradation, evidenced by a sharp torque drop, occurred. However, in this Example 1 a level plateau was not achieved. Mixing was continued for 120 minutes or until the torque decreased to 1000 meter-grams, whichever occurred first. The area under the curve of the plot of torque versus time was measured from 10 minutes to 110 minutes or to the time when the torque required decreased to 2000 meter-grams. The area under the curve measured 106,000 meter-gram minutes. This example demonstrates that the addition of 0.2 weight percent of ascorbic acid to the composition similar to that prepared in Experiment C increases the stability of the composition by a factor of about 2.3.

EXAMPLE 2

A composition was prepared by mixing 80 grams of poly(ethylene oxide) of an average molecular weight of about 4,000,000 with 0.1 grams of tertiary butyl hydroquinone, 10 grams of propylene glycol and 10 grams of distilled water in a mixer. The tertiary butyl hydroquinone was added to the poly(ethylene oxide) first followed by blending for five minutes. The propylene glycol and the water were then added using procedures similar to those described in Example 1. The test and analysis were conducted using procedures and conditions similar to those described in Example 1. The area under the curve measured 249,000 meter-gram minutes. This example demonstrates that the addition of 0.1 weight percent of tertiary butyl hydroquinone to the composition similar to that prepared in Experiment C increases the stability of the composition by a factor of about 5.3.

EXAMPLE 3

A composition was prepared by mixing 80 grams of poly(ethylene oxide) of an average molecular weight of about 4,000,000 with 0.2 gram of butylated hydroxyanisole, 10 grams of propylene glycol and 10 grams of distilled water in a mixer. The butylated hydroxyanisole was added to the poly(ethylene oxide) first followed by blending for five minutes. The propylene glycol and the water were then added using procedures similar to those described in Example 1. The test and analysis were conducted using procedures and conditions similar to those described in Example 1. The area under the curve measured 249,000 meter-gram minutes. This example demonstrates that the addition of 0.2 weight percent of butylated hydroxyanisole to the composition similar to that prepared in Experiment C increases the stability of the composition by a factor of about 5.3.

EXAMPLE 4

A composition was prepared by mixing 224 grams of poly(ethylene oxide) of an average molecular weight of about 4,000,000 with 336 grams of sodium carboxymethylcellulose, 0.23 grams of butylated hydroxyanisole and 0.23 grams of ascorbic acid in a mixer and blending for five minutes. To this blend was added 70 grams of propylene glycol and 70 grams of distilled water using procedures similar to those described in Example 1. The composition was milled on a laboratory two-roll mill for five minutes at about 80° C. A sheet was removed from the mill and passed through a three-roll calender at 80° C. The final film gauge was 0.010 inches. One-inch wide strips of this film measuring 12 inches in length were elongated 5 percent in the direction the film was removed from the calender. The films were clamped in the elongated state and remained so for over 500 hours without breaking. This example demonstrates that films made from the compositions of this invention have excellent stress endurance capabilities.

What is claimed is:
1. A composition comprising:
  (a) from 25 to 98 weight percent, of a poly(ethylene oxide) having an average molecular weight of from 600,000 to 10,000,000;
  (b) from 1 to 50 weight percent of water;
  (c) from 1 to 50 weight percent of propylene glycol; and
  (d) from 0.01 to 1 weight percent of a stabilizer from the group consisting of ascorbic acid, monobutylated hydroxyanisole, and tertiary butyl hydroquinone;

wherein the concentrations of (a), (b), (c) and (d) are based on the total weight of the composition.

2. A composition as claimed in claim 1, wherein (a) has a molecular weight of from 600,000 to 5,000,000 and is present at a concentration of 35 to 90 weight percent; (b) is present at from 5 to 20 weight percent; (c) is present at from 5 to 20 weight percent; and (d) is present at from 0.1 to 0.5 weight percent.

3. A composition as claimed in claim 1, wherein the stabilizer is ascorbic acid.

4. A composition as claimed in claim 1, wherein the stabilizer is a monobutylated hydroxyanisole.

5. A composition as claimed in claim 1, wherein the stabilizer is tertiary butyl hydroquinone.

6. A composition as claimed in claim 1, wherein (a) has a molecular weight of from 3,000,000 to 5,000,000 and (d) is a mixture of ascorbic acid and monobutylated hydroxyanisole.

7. A composition as claimed in claim 1 in the form of a shaped article.

8. A composition as claimed in claim 1, wherein a filler is present at a concentration of from 45 to 55 weight percent.

* * * * *